Patented Apr. 9, 1946

2,398,102

UNITED STATES PATENT OFFICE 2,398,102

LATEX TREATMENT

Jack K. Lockridge, Inglewood, Calif., assignor to Wingfoot Corporation, Akron, Ohio, a corporation of Delaware No Drawing. Application May 13, 1943,
Serial No. 486,845

2 Claims. (Cl. 260—821)

This invention relates to the coagulation of latex by the production of acid within an alkaline latex composition. The process of the invention will, perhaps, be most advantageously used in the coagulation of latex froth to produce a cellular product. The acid is produced by the gradual interaction of chloral hydrate, bromal hydrate, chloral alcoholate or bromal alcoholate and potassium cyanide or sodium cyanide or other alkali metal cyanide. In a preferred method of producing a coagulated froth, one of these reagents is mixed with the latex, etc., before frothing, and the other ingredient is added to the froth just prior to pouring it into a mold. The mold may be that used for a mattress, pillow or the like.

The production of the acid is represented by the following equation:

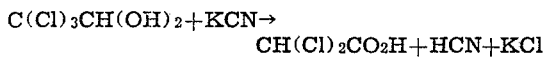

The latex may be formed of particles of either natural or synthetic rubber, and the dispersion may be a liquid or frothed latex. The above reaction causes a gradual lowering of the hydrogen ion concentration in the latex composition, due to the formation of the dichloro-acetic acid and the hydrocyanic acid. In the course of several minutes, depending upon the amounts of hydrate and cyanide added, the hydrogen ion concentration is reduced to the point where coagulation occurs. The other reagents may be similarly used to liberate hydrocyanic acid. The following example illustrates the process:

To 300 cc. of latex of 57 per cent solids is added 10 grams of chloral hydrate in 15 cc. of water, 11 cc. of a 35.5 per cent solids solution of the potassium soap of castor oil and 7 cc. of Triton NE (a wetting agent manufactured by Rohm and Haas, of Philadelphia); and this may be a compounded latex, and it may be frothed to the desired volume, which may, for example, be about 8 volumes of air to 1 volume of liquid. Two grams of potassium cyanide dissolved in 10 cc. of water are quickly mixed into the latex. If a froth, this is done immediately before the froth is poured into the mold. The drop in pH is indicated in the following table, in which the times reported indicate approximately the lapse of time after adding the potassium cyanide to the latex:

| Time | pH |
|---|---|
| 0 | 9.40 |
| 3 minutes | 8.30 |
| 4 minutes | 8.00 |
| 5 minutes | 7.80 |
| 5½ minutes | 7.65 |
| 6 minutes | 7.65 |
| 7 minutes | 7.55 |
| 23 minutes | 6.50 |

In this particular case, the latex gelled after about 5½ minutes. The pH of the latex was measured by a glass pH electrode embedded in it.

In compounding a latex for such a process, zinc stearate may be used instead of zinc oxide.

If preferred, the potassium cyanide may be added to the latex before frothing, and then the chloral hydrate is added after frothing and immediately before pouring the froth into the mold. If circumstances warrant, both the cyanide and hydrate may be added together to the froth immediately before pouring it into the mold.

The rate of pH drop may be speeded up or slowed down by raising or lowering the temperature of the mixture or by using more or less of the cyanide and hydrate. These two reagents are preferably used in equimolal proportions.

What I claim is:

1. The method of coagulating natural latex which comprises adding to the latex an equimolecular mixture of chloral hydrate and an alkali metal cyanide.

2. In a method of preparing sponge rubber by frothing latex, the steps which comprise forming a frothed latex having distributed therethrough an equimolecular mixture of an alkali metal cyanide and a compound selected from the group consisting of the bromal and chloral hydrates and alcoholates and thereafter allowing the frothed latex to gel.

JACK K. LOCKRIDGE.